Figure 7:
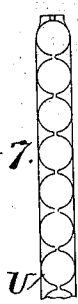

(No Model.) 2 Sheets—Sheet 1.
A. M. WELLINGTON, Dec'd.
A. B. WELLINGTON, Executrix.
STEP SERIES ENGINE PROCESS AND APPARATUS.
No. 549,982. Patented Nov. 19, 1895.
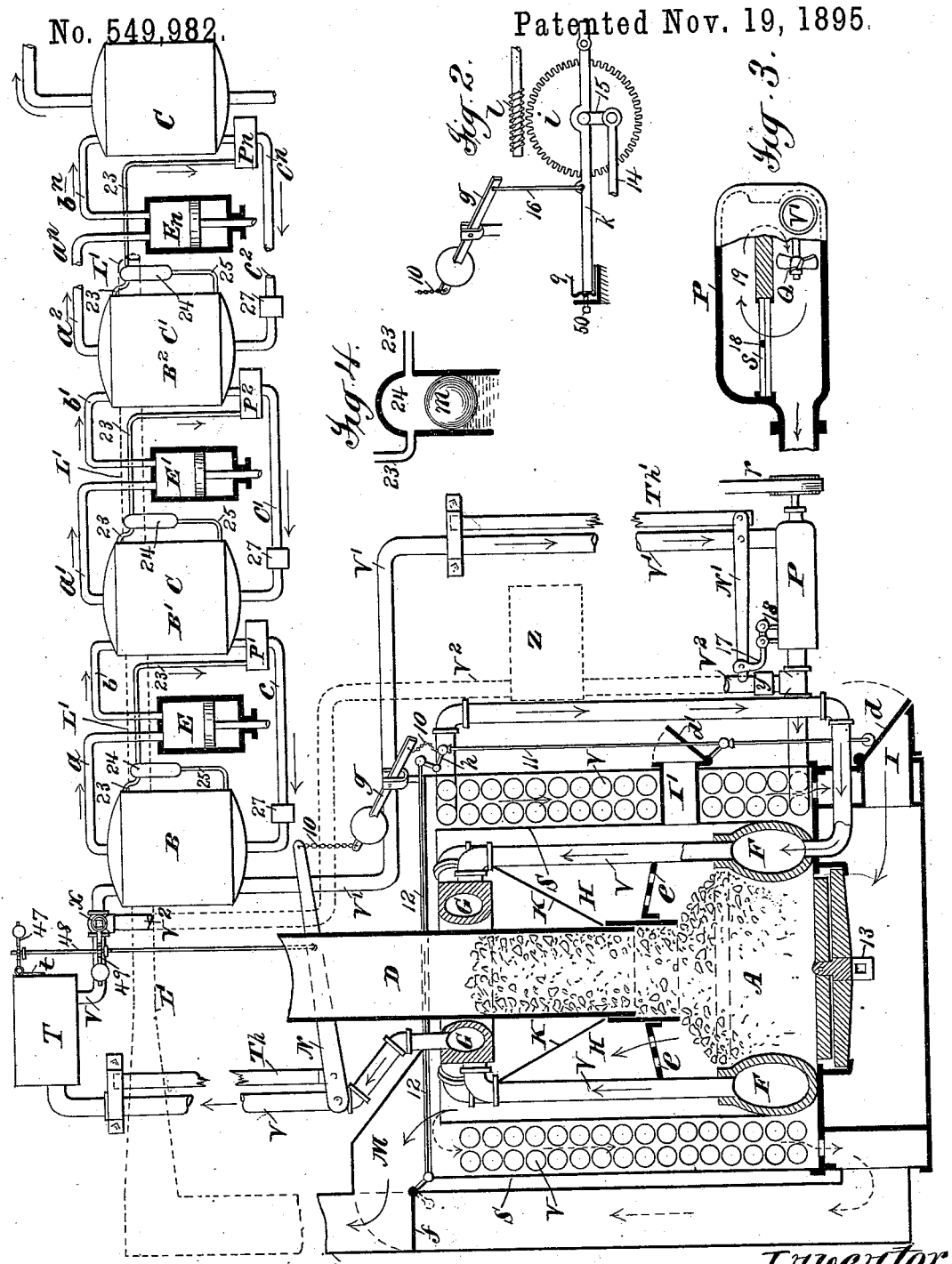

(No Model.) 2 Sheets—Sheet 2.

A. M. WELLINGTON, Dec'd.
A. B. WELLINGTON, Executrix.
STEP SERIES ENGINE PROCESS AND APPARATUS.

No. 549,982. Patented Nov. 19, 1895.

Attest:
T. F. Kehoe.
C. J. Sawyer

Inventor:
A. M. Wellington
By Philipp Munson & Phelps
Attys

UNITED STATES PATENT OFFICE.

ARTHUR M. WELLINGTON, OF NEW YORK, N. Y.; AGNES BATES WELLINGTON EXECUTRIX OF SAID ARTHUR M. WELLINGTON, DECEASED.

STEP-SERIES ENGINE PROCESS AND APPARATUS.

SPECIFICATION forming part of Letters Patent No. 549,982, dated November 19, 1895.

Application filed April 12, 1894. Renewed April 20, 1895. Serial No. 546,531. (No model.)

*To all whom it may concern:*

Be it known that I, ARTHUR MELLEN WELLINGTON, a citizen of the United States, residing at New York, county of New York, and State of New York, have invented certain new and useful Improvements in Step-Series Engine Processes and Apparatus, fully described and represented in the following specification and the accompanying drawings, forming a part of the same.

This invention relates to an improved process and apparatus for converting heat into work under that special type of engine process wherein an expansion heat-engine of any type exhausts into a boiler of some form wherein the heat of vaporization is used to heat and thus generate or increase vapor pressure in some more volatile working substance for a second engine, which second engine in its turn exhausts or may exhaust into another boiler wherein its otherwise waste heat is used to generate or increase vapor pressure in some still more volatile working substance for a third engine, and so on for any number of steps desired until the attainable temperature limits are exceeded.

This process and the engine embodying the same, sometimes called simply the "series" process and engine, will be referred to throughout the specification as the "step-series" process and engine.

The theoretical possibilities of this step-series process have long been known and are very great, since their limits are fixed only by the materials and in no way by the nature of the process itself, as is the case in the single expansion or Watt process, which latter admits of working through a very limited temperature range only and admits of extension within this range only under a rapidly-increasing disadvantage from low mean pressures. Nevertheless, although these theoretical possibilities have been of common knowledge for more than a century and have resulted in numerous attempts to utilize some of them practically, such efforts have met with so little success that very few, if any, such engines are now in use, and the process as practically applied has thus far shown but little, if any, practical utility, and is not a factor of modern engine practice. The failure of this process heretofore has been due, chiefly, to a failure to secure and utilize small thermal heads, or differences of temperature between the heating and heated substances, primarily in the first boiler and secondarily in the subsequent boilers and condensers, so that it has been impossible to provide thermal room for the series of boilers and engines except under very disadvantageous conditions. The cause of this difficulty is as follows: Modern boiler practice is based upon the radically erroneous principle of attacking the working substance with a fierce irregular heat acting upon small massive surfaces with a very great thermal head. This error has been extended largely by analogy to modern condenser practice, and attempts which have been made to utilize the step-series process have copied after these defective methods, with resulting loss of effective thermal range because of high thermal heads, which have been fatal to the usefulness of this process.

To establish a field of usefulness for the step-series process, it must show considerable advantage over a condensing single-engine process, since the latter will be the simpler mechanically. The condensing steam-engine alone will readily work down to one-third of an atmosphere absolute pressure, corresponding to 72° centigrade (160° Fahrenheit) steam temperature. The natural cold body into which the waste heat is voided is rarely colder than 10° to 15° centigrade, (50° to 59° Fahrenheit,) and all or most of the remaining small range between these two temperatures is necessarily consumed to effect condensation under modern condensing conditions. There is therefore no thermal room to add another engine below the complete single-engine process, and all that can be gained by cutting short this latter process to make room for a second engine below it is to secure higher mean pressures by expanding two masses of working substance slightly instead of one mass to the utmost, and even then the room is scant. If we cut the first process short, we have to deduct two intervals for thermal head instead of one, and the loss from this additional interval and from adding the mechanical complexity is greater than the gain from the higher unit pressure, and the total temperature range which may be actually worked through is less with the two engines than can be covered with one. Under the conditions of current practice, therefore, there is really nothing to be gained by adding another engine below a steam-engine, and there is practically as little room above the steam-engine, since temperatures of about 350° centigrade (662° Fahrenheit) are now used and required to enable a single steam-engine to work within the range that it can well cover—that is, from about 180° centigrade to 72° centigrade. The possible theoretical efficiency within this latter thermal range is about twenty-four per cent.; but the practical difficulties of working through even the smaller of these ranges with a single engine cuts down the efficiency in practice by one-half or more, or to some ten to twelve per cent., the greater portion of this loss resulting from the attempt to expand a single mass of steam through the last half of the temperature range. It is chiefly to save this loss that efforts to utilize the step-series process have previously been directed, and these efforts have failed chiefly on account of the loss of range resulting from the additional thermal head required. It will be seen that nearly two-thirds of the loss of range—350° centigrade to 180° centigrade—lies in the primary process of generating the steam in the first boiler. I avoid this loss by substituting for the now usual boiler process a process of generating steam by the use of a circulating fluid, which forms the effective connection between the heater and boiler, in connection with a boiler especially adapted to use therewith, which is capable of working with extremely small thermal heads. I am thus enabled to create a wide thermal field for the step-series process, and I utilize this by repeating in the subsequent boilers the process features of the primary boiler, so as to work through these boilers also with extremely small thermal heads. Some of the mechanical details and regulative features preferably used in the first boiler, however, in which the circulating fluid is preferably a liquid acted on by fire, are not necessarily nor preferably repeated in the subsequent boilers for reasons hereinafter explained. These two features of my invention will be described in their logical order—that is, first, the improvement in the primary process of generating the vapor pressure, and, secondly, the improvement in the method of utilizing the vapor pressure on the step-series principle. Referring now, therefore, to the process by which pressure is generated in the first boiler, the basic element of the improvement by which wide thermal room is created for the step-series process in the higher temperatures where no room now exists lies in the dissociation of the fire or other irregular source of heat from the boiler and the effective connection of the two by a heat-conveying substance which is passed from the source of heat to the boiler, and, except for special reasons, preferably returned to the source of heat to be reheated, so as to move in a closed cycle. This heat-conveying substance I call for convenience the "circulating fluid," whether it be worked in closed cycle or open cycle. It is preferably a liquid, but may be solid or gaseous in part or whole, and its sole function as a part of this process is to flow around in passage-ways, which are usually endless, being preferably in continuous motion and under more or less careful regulation as to speed and temperature, and thus to convey heat to the working substance. Prominent cases of the use of the circulating fluid in open cycle are the following: In certain special applications of the process a surrounding mass of air or water already heated to the desired point may be drawn upon for the circulating fluid and used in open cycle, and the gases of combustion may and in larger plants should be used as a part of the circulating fluid, and such gases must be used in open cycle, even though the rest of the circulating fluid be used in closed cycle. The circulating fluid may consist either of one or of several different heat-conveying substances, circulated either as a common mass, or, as is often expedient for practical reasons, in two or more distinct sets of passage-ways; but in either case it is spoken of collectively as the "circulating fluid." It may or may not be circulated under pressure to increase its temperature while liquid. Suitable circulating fluids, in the order of their usual merit, are water, air, or other gas under atmospheric or higher pressures, and paraffine or other oils. The working substance to which heat is applied by surrender from the circulating fluid in the first boiler may be any suitable gaseous or liquid substance in which the vapor-pressure may be generated or increased with a low thermal head, so as to leave as wide a range of temperature as possible for the succeeding boilers and engines of the step series.

In this specification and the claims all gases are considered as the vapors of liquids, whether ordinarily condensable or not.

The "dissociation" of the source of heat and working substance is simply a thermal dissociation, which may or may not be mechanical, also. Ordinarily two parts which are intended to be thermally dissociated should not be mechanically contiguous, but mechanical convenience may often render this expedient, even at some slight sacrifice of thermal dissociation. Whenever the source of heat and the working substance are so disposed that the circulating fluid may serve as the effective thermal connection between them to the exclusion of interference by unregulated heat with the moderate and controllable action of the circulating fluid so far as is practical the source of heat and working substance are thermally "dissociated" within the meaning of the term as used herein, although there may be some considerable residue of direct action of the one upon the other by conduction of heat through common metallic parts or otherwise. By this apparently simple change of process we are able to operate with very small thermal heads for the following reason: The substance heated by fire being preferably a liquid which is not permitted to vaporize to any extent within the heater may be heated to temperatures much higher than are prudent or possible in an ordinary boiler. It is preferably carried in pipe-surfaces brought close to the fire, in which a high temperature is quickly attained. By using this hot fluid only to supply heat to the boiler we eliminate all temperature-strains in the boiler by subjecting it only to a regulated and uniform heat, so that the heating-surfaces may be thin and thus provide for a full and quick transmission of heat from the circulating fluid to the working substance. We can therefore get a large heating-surface in a small space. We may multiply many times the efficiency of the heating-surfaces when the circulating fluid is a liquid by securing liquid instead of gaseous contact with the heating-surface. We may radically improve the functional action of the boiler by applying our greatest heat at the top instead of the bottom and carrying the heating and heated substances in opposing currents past each other, which, in connection with an even distribution of the heat internally, will be found to avoid the necessity for and tendency to circulation of the working substance. The necessity for circulation being thus avoided, as also the tendency, we may permeate the entire interior of the boiler with our heat-supply, preferably the steam-space as well as the water-space, by using a large number of small closely-set tubes or their equivalents, thus insuring perfectly dry and somewhat superheated steam, and also, which is still more important to this process, producing differential temperatures in horizontal strata, coldest toward the bottom, so that the heating substance may be discharged at the bottom considerably colder than the heating substance is discharged at the top. At the same time we abolish all sensible tendency to foaming in the boiler, so that it may be carried nearly full of liquid, thus sensibly increasing the proportion of highly-active surface.

I now proceed to describe more precisely the details of the process above outlined, and especially its preferable form, as the process cannot be used without great sacrifice of these possible advantages, except in connection with certain regulatory and other adjuncts, so far unconsidered. If the circulating fluid be a liquid, an expansion-tank or its equivalent must be used, and it is then theoretically possible, by providing circulating-passages of immense strength and by substituting great vigilance for automatic regulation, to use the process with an unregulated fire and an ordinary type of boiler and realize some of the advantages which have been described; but to obtain the best results from the process, whether the circulating fluid be a liquid or a gas, it should include one or more of the following features, and to realize its highest advantages it should include them all. These adjuncts will be described in their logical sequence in the process.

*Adjunct A.—Regulation of the Maximum Temperature of the Circulating Fluid.*

By this I mean the regulation of the temperature of the circulating fluid on the hot side—that is, as it passes to the boiler—which is its maximum. This is the most essential element in respect to safety of the apparatus when the fluid is heated by the direct action of fire. Of course any danger of explosion from increase of pressure may be guarded against by a suitable safety-valve, which in any case should be added as an additional precaution; but this involves loss of fluid from the circulating-pipes and consequent disabling of the apparatus. It should very rarely be called into action, and never in normal working.

For the regulation of the maximum temperature of the circulating fluid three general methods are possible, which are independent of each other and may be effected by different means and which, preferably, are all used. These are the regulation of the air supply, the regulation of the fuel supply, and the waste of heat after combustion.

The air supply can be regulated automatically with great exactitude by making the heater as nearly air-tight as may be and providing two openings for air supply, respectively, below and above the grate. Both openings may be controlled by any simple valve, preferably plain flap-valves, which should close the lower opening completely when the temperature or pressure of the circulation reaches a desired working maximum and which should open the upper opening pretty widely before heat begins to be wasted, as hereinafter described, as it has the double effect of checking the production of heat as well as wasting heat, and thus is more economical.

The regulation of the fuel supply may be very easily effected by a valve, if any form of liquid, gaseous, or pulverized solid fuel be used. If the fuel be coal in any form, such direct regulation is not possible; but in practical effect it may be closely approached by the use of a grate-shaker automatically adjustable, so that the grate motion ceases or is diminished whenever the circulating temperatures begin to rise above the desired maximum.

There are four obvious efficient ways of securing the wasting of the heat after combustion, all of which may be used, and which are preferably brought into action in the following order: opening a direct escape for the gases of combustion so that their heat is wasted; passing the circulating fluid through a wasteful cooler after it leaves the heater; a temperature safety-valve positively opened, and a pressure safety-valve opened by excess of pressure. As all these methods are wasteful, they should not be the primary reliance for heat regulation, but the regulative methods previously described, which are a check upon the actual generation of heat, are preferably used in all cases, whether with or without any or all of these wasteful methods.

The opening of an escape for the gases of combustion may be secured by a damper of any common form actuated by any suitable means, such as a thermostat. The temperature safety-valve may be placed in any suitable position upon the circulating system and operated by any similar means, and any common or suitable form of pressure safety-valve may be used. The best method of cooling the circulating fluid after it leaves the heater is by directing the circulating fluid from the normal circulating system into an open evaporative tank when the temperature rises too high, thus cutting out the boiler. This change of the circulation is preferably controlled automatically by means coming into effect before the safety-valves, but after the other regulative means above stated; but it is preferably controllable manually, also, so as to cut out at once the circulating fluid from the boiler when the boiler system is thrown out of operation. Whenever gaseous, liquid, or pulverized solid fuel is used, however, this change of the circulation becomes unnecessary, because in that case the generation of heat can be stopped as suddenly as its use.

It is obvious that many different means may be used for securing regulation of the maximum temperature by some or all of the methods above pointed out, and that either thermostatic or pressure regulation may be used. I prefer the former; but whichever is used we may, by a single thermostat or regulator, control all the regulative features above described, so as to act at successive small increments of temperature or pressure.

*Adjunct B.—Regulation of Volume of Circulating Fluid.*

The circulation may be effected in part or whole by the natural action of the difference in gravity of hot and cold fluids, the expansion-tank being placed at the top of the system and the heater at or near the bottom, and a natural circulation may thus be secured, which alone may nearly or quite suffice if the circulating-passages be made large enough, especially as in this process only one boiler is served by the circulating fluid; but if for any reason a specially-fast circulation is wanted a circulating-pump may be expedient. It is desirable in all cases that the circulating fluid shall be maintained in a nearly constant volume to prevent the generation of steam in the heater, which is dangerous. When low temperatures only are used, it may be found sufficient to fill a small tight drum about half full and rely on occasional inspection to maintain the proper height of fluid within it. For higher temperatures this regulation of volume may be secured by using a very large expansion-tank, or by providing means for regulating with some exactitude the level of liquid within it, as by a storage-tank automatically controlled. The former is the simplest expedient; but the expansion-tank may be made much smaller and the volume of circulating fluid kept constant, regardless of temperature or oversight, which is highly desirable, by providing a separate storage-tank at some convenient point, preferably higher than the expansion-tank, and connecting it therewith in such manner that when the expansion-tank is more than about half full liquid flows from it to the storage-tank, and when it is less than half full liquid flows into it from the storage-tank. The storage-tank need not be higher than the expansion-tank, if some slight and constant pressure be substituted for gravity. Any other suitable means for this purpose may be used, however.

*Adjunct C.—Boiler Process.*

The circulating fluid when otherwise properly handled may be used with great advantage with any kind of primary boiler; but in order to utilize to the utmost the advantage of working with small thermal heads the primary boiler should embody the following features: The circulating fluid or heating substance should be applied first to the hotter parts and then to the colder parts of the working substance, being passed downward from top to bottom of the boiler, the passage downward being circuitous through passages forming uniformly-distributed and closely-spaced heating-surfaces and preferably filling both the steam and water space.

By "uniform distribution" is meant such distribution of the heating-surfaces that all of the vertical columns into which the water in the boiler may be conceived to be divided between such heating-surfaces and between the heating-surfaces and the boiler-shell shall receive substantially the same amount of heat and be of the same mean temperature and density, and no cold spaces be left for downward circulation, as in the boilers now in use. The distribution of the space between the heating-surfaces and between the heating-surfaces and boiler-shell will depend upon the nature and size of the heating-surfaces employed. If tubes be used and they are of the same size throughout the boiler, the spacing will be equal; but the spacing may and preferably should increase somewhat with the size of the tubes, if different-sized tubes be used. By "closely spaced" is meant that the heating-surfaces must be spaced at such distances apart as to avoid the formation of any cold interspaces through which downward circulation may be set up. If tubes be used, the requisite spacing will depend somewhat upon their size and the intensity of the heating action, the smaller the tubes and the lower the intensity the closer the spacing required. The effect of this construction is that the working substance is at differential temperatures and densities throughout in horizontal layers, lightest at the top and heaviest at the bottom, and therefore actively resists and prevents any circulation which the pressure generation might otherwise cause. By thus avoiding the tendency and need for circulation of the working substance it will easily be seen that we secure many important advantages. Thus we may reduce the contained quantities of working substance, as we need no large liquid mass to receive irregular heat impacts, because we have none, and we need no such mass to prevent excessive steam generation at particular points or moments, because our steam generation, if excessive, is not affected by interior volume and must be controlled in other ways. We need no wide spacing of tubes for interior circulation, and the tubes therefore may be and preferably are very closely spaced, whatever their size, thus enabling the whole interior of the boiler to be practically filled with heating-surface. The heating and heated substances are carried in opposing currents past each other, and by thus introducing differential temperatures within the chamber we reduce largely the mean thermal head by enabling the heating substance to be discharged colder than the heated substance, as already described, which is of great importance in the step-series process. Moreover, as the tubes no longer need to be large or thick to let gases of combustion pass through freely or to resist temperature strains or abrasion of cinders, they may and should be quite small, to decrease the weight and increase the heating area. So far as I yet know one-fourth-inch copper tubes are very suitable for any size of boilers; but larger sizes may often be usefully employed, and, perhaps, longer experience will indicate that larger or smaller tubes than I now favor are preferable. Moreover, the boiler-surfaces need not be tubes at all, but on account of ease of mechanical construction may preferably be a mass of thin flat plates closely spaced and indented or corrugated so as to keep their spacing against opposing pressures of different amounts. For use under this process I prefer plate to tube boilers, if properly designed. I have found that the boiler will ordinarily give the best results when two-thirds to four-fifths full of liquid, since there is no tendency to foam, despite the close spacing, and it is better to have a considerable area of heating-surface—perhaps ten to fifteen per cent. of the whole—devoted to superheating uses alone.

As we have no need for any steam-space beyond what is required for generating and superheating the steam, it follows from all that has preceded that the best primary as well as secondary boiler for use in this process will consist of a mass of thin and delicate heating-surfaces filling "steam-space" and "water-space" alike, without any distinction between them, with no greater total bulk than is needed to insure enough heating-surface, with the circulating fluid or heating substance entering hot at the top and working its way downward to the bottom, and with the working substance entering cold at the bottom and leaving hot at the top without circulation.

Other details may be varied at pleasure within wide limits, as also the character of the heating-surfaces; but the character and arrangement of surfaces described will be found to secure many advantages.

*Adjunct D.—Regulation of Minimum Temperature of Circulating Fluid.*

By this I mean the regulation of the temperature of the circulating fluid on the cold side—that is, as it passes from the boiler—which is its minimum. The best method of effecting this regulation is by a thermostat and the best method of applying a thermostat is to regulate with it the speed of circulation, so that if the circulating fluid is leaving the boilers too hot its speed may be checked, and if too cold its speed may be increased. If the minimum temperature be not regulated, we shall not have a constant mean temperature within the boiler, even though we have a constant maximum, and we shall often have the circulating fluid returning to the heater so hot as to waste much heat. When a circulating-pump is used, it will probably be found best to have the pump throw some excess over the maximum demand for circulation and provide a thermostatically-controlled by-pass which permits a varying percentage of the fluid pumped to circulate through the by-pass without making the circuit through the heater or boiler; or a thermostatically-controlled valve on the circulation-pipe may be used with or without a pump. It is possible to regulate the minimum temperature in other ways than by regulating the speed of circulation—as, for instance, by making the withdrawal of steam perfectly uniform or by varying the area of the boiler-surface immersed in working substance; but regulation by varying the speed is simplest and best.

*Adjunct E.—Regulation of Quantity of Working Substance in Boiler.*

As the form of engine embodying the present invention includes a condenser for the steam and the condensed steam is preferably returned to the boiler, so as to work in closed circuit, it is evident that devices for regulating the quantity of working substance in the boiler may conveniently be omitted, especially with small engines. It will generally be more convenient, however, especially with larger engines, to use a larger quantity of working substance than required to serve as a reserve against leakage and to automatically control the feed-pump by which the condensed working substance is returned to the boiler, so as to maintain the desired quantity of working substance in the boiler, any overplus being retained in the condenser. This result may be so simply attained that it may be found better in all cases to thus regulate the water-level directly. It will be understood that any one of a variety of well-known devices may be used to effect this regulation, the proper one to select depending primarily upon how the feed-pump is driven, whether directly from the engine, by a separate engine, by electricity, or by the direct action of steam. I prefer the latter for this process.

*Adjunct F.—Regulation of the Degree of Pressure that Can Exist in the Boiler.*

This adjunct is not of great importance to this process, since the small thermal heads which are especially aimed at prevent any objectionable increase of pressure when such thermal head ceases to exist from stopping the withdrawal of steam from the boiler; but it will preferably be used and may best be secured by a mere water safety or blow-off valve through which, when the steam-pressure reaches a certain excess above the desired working pressures, all liquid is blown out of the boiler and preferably back into the condenser. The pump, if operated by direct action of steam, will then immediately begin to return the water to the boiler, but will not be able to do so in any quantity until the pressure falls below that at which the liquid blow-off opens. So far as boilers of the type described require any safety-valve, a liquid blow-off valve, through which the liquid contents of the boiler may blow back into the condenser, is always preferable to a steam safety-valve.

By the process which has been described above in its preferred form I create a wide thermal field for the step-series process, and this process and apparatus embodying the same may be used in combination with any suitable step-series process and engine, and such a combination forms a part of the invention, as by the above process I am enabled to provide a wide thermal field for use by the step-series process, and this forms an important advance in this art, even in connection with the existing defective methods and apparatus for utilizing this field.

The invention includes, also, an improved process and apparatus by which a reduction in the thermal heads required for the secondary steps of the step-series process is secured, thus increasing very largely the number of engines that may be introduced below the first engine, and so securing in itself, whether combined with the process above described or used with other systems for generating steam in the first boiler, a valuable improvement in this art. I prefer, however, to combine this improved process and apparatus for the second and subsequent steps of a step-series engine with the primary process above described, the two coacting together to secure the highest efficiency, the process and apparatus for the first boiler securing a wide thermal field for the secondary steps and the improved process and apparatus for the secondary steps utilizing this field in the best manner.

In utilizing the wide thermal field secured by the primary process above described I repeat in the apparatus for carrying out the secondary steps of the step-series process the general process features of the primary boiler, as above described, although not necessarily or preferably the detail features on account of the nature of exhaust-steam, which is already regulated in temperature. As condensing steam is not lowered in temperature by its surrender of heat, the entire heat of vaporization may be surrendered without any decrease in temperature other than the slight difference which results from the decreasing pressure, and by a proper arrangement of the boiler-condenser the effect of this slight difference also may be eliminated with the net result that a very small loss of range, 5° to 20° centigrade, (9° to 36° Fahrenheit,) at most, is involved by each successive step and engine. This reduces the loss of range involved in getting the heat into and out of the steam to very small proportions, and thus enables us to use additional steps freely and so avoid all need of working each engine through a wide range and with high expansion, with the effect of heavily reducing engine bulks and weights.

In carrying out the process a single boiler-condenser for each step and engine is preferably used to effect the heat-transfer, and the features of these boiler-condensers are as follows: It is of especial importance in these secondary boilers that the heat-transmitting surfaces be thin, and they preferably have only the thickness and range of thickness of good stout paper—say from one-fifth to one millimeter—although it is obvious that this thickness may be increased somewhat without great loss of efficiency. These thin surfaces in secondary boilers not only secure the advantage of providing a large amount of heating-surface in small space, thus economizing space as well as weight, but also aid directly toward obtaining a very small thermal head between the temperature of the effluent hot vapor and the temperature of the incoming exhaust-steam, by which said vapor is heated, and if the application or removal of the heat, or both, be intermittent the thinness of the surfaces will materially increase the quantity of heat which will pass during the intermittent instants when the conditions are most favorable for transmission, and such intermittent application and removal of the heat naturally occurs in the operation of most engines.

The steam to be condensed should not be poured in *en masse* and left to distribute itself properly by its internal pressure only, but should be conducted through a series of passages, by which it enters at the top of the boiler-condenser and gradually works its way down to the bottom thereof, being hottest at the top and coldest at the bottom, and thus securing the most effective conditions for condensation, and either the proper distribution of the condensing steam to the heating-surfaces or its complete condensation by less than the full surface, since the progressive cooling of the steam of itself produces a differential pressure, which tends to force the steam forward and downward through these passages.

The liquid to be evaporated or working substance should not be discharged into an interior open chamber and circulated up and down, but should enter at the bottom, where the temperature is lowest, and downward circulation be prevented, so that it passes continuously upward and in close contact throughout with closely-spaced heating-surfaces, against which it continually impinges until it is vaporized and superheated, so far as the temperature of any portion of the entering exhaust-steam permits. It is important that circulation be prevented, and this is secured by the passage of the steam downward through the working substance and by the uniform distribution and close spacing of the heating-surfaces, as fully described above in connection with the primary boiler. In this manner, by sufficiently careful design, preventing circulation, using large heating-surfaces with very close spacing, it may be insured that the final temperature of the generated steam shall be sensibly higher than the final temperature of the condensed liquid, and even when this result is not attained there may be in all cases a close approach to it, thus greatly diminishing the otherwise necessary thermal head, which is of the highest importance to the step-series process.

So different is the proper thickness and spacing of heating-surfaces desirable under my process from anything in use that these surfaces can hardly be too closely spaced if the best results are to be secured, whereas the now usual process of steam generation and of condensation as well, which depends upon circulation of the working substance and treats the interior as a single chamber to be subjected to uniform temperature conditions, demands in all cases quite wide spaces. If tubes are to be used, so different are those recommended—say one-third millimeter thick and six to eight millimeters diameter—from any of present practice that I have found them obtainable only from manufacturers of metal pencil-cases, and while it is difficult to define the limits of thickness and size of tubes they cannot be said to be thin and small in the sense in which these terms are used herein unless far thinner and smaller than any condensing-tubes of current practice. In fact, the attainment of the best results with this process demands that the surfaces shall be even thinner than is commercially attainable with tubes, and for this reason I recommend below the use of corrugated or indented plates for forming the boiler-condensers, whether or not the same construction be adopted for the primary boiler.

As above stated, a single boiler-condenser is preferably used between each pair of engines to effect the heat transfer; but this is not a necessity. In fact, it is sometimes a mechanical convenience to dissociate the engines, and it may be convenient to carry off some of the heat between any two steps of the process for some other use. It is obvious that by the use of the circulating-fluid process above described we may substitute for a single boiler-condenser two such chambers and connect the two by a circulating fluid, or preferably in some cases by an intermediate vaporizing substance. In this case the steam to be condensed will be discharged into the first chamber, which is merely a condenser, and there heat the circulating fluid which passes to the second chamber, which is merely a boiler, and in which the circulating fluid surrenders its heat to the second working substance, securing the same result as if the steam-heat had been applied to the same substance directly in the first chamber. Two duplicate chambers are thus required in place of one; but they are small, cheap and light, and a very slight mechanical advantage may suffice to warrant this duplication. Of course the exhaust-steam may be piped directly for a considerable distance and the additional chamber saved; but by transfer the heat may always be carried more compactly and, perhaps, in a substance more suited for some incidental intermediary use. It will be understood, therefore, that two chambers, as above described, may be used in place of and as the equivalent of a single boiler-condenser.

It will be understood by those skilled in the art to which the invention relates that the complete process above described may be carried out by apparatus widely different in construction, arrangement, and mechanical detail, and that the invention, considered broadly, is not to be limited to any particular form of apparatus employed or of the devices forming parts thereof. For the purpose of illustration, however, I have shown in the accompanying drawings, forming a part of this specification, a simple apparatus for carrying out the complete process, this apparatus and the special devices shown being especially well suited for the purpose, and the general combinations of this apparatus and certain specific features of the same form part of the invention covered by this application.

Figure 6:
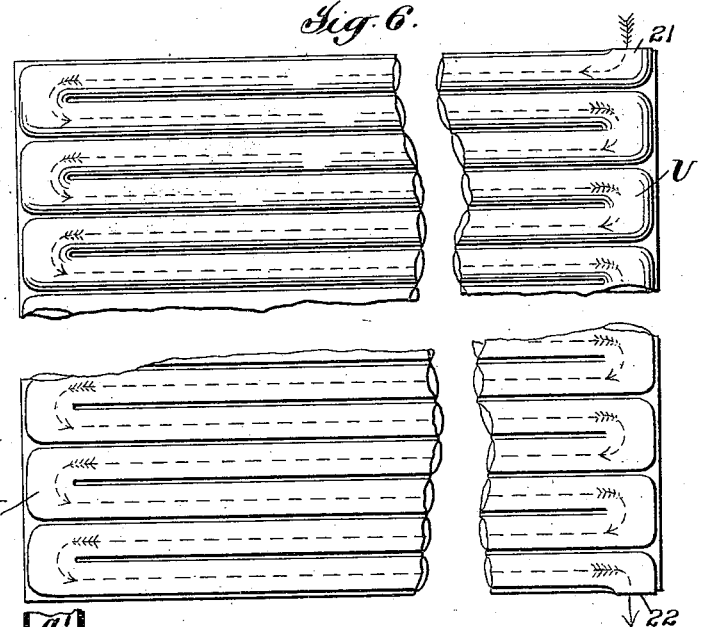
Figure 5:
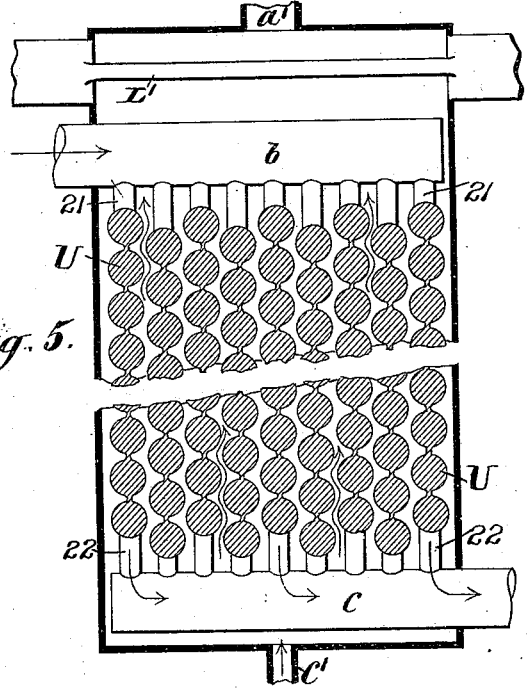
Figure 8:
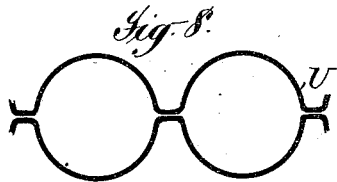
Figure 9:
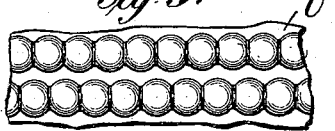
Figure 10:
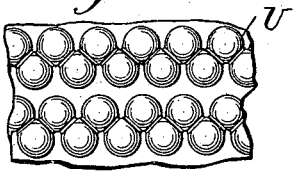

In the drawings, Figure 1 is a general view, largely diagrammatic, of a substantially complete apparatus embodying the system in its complete form. Fig. 2 is a detail view of the grate-shaker. Fig. 3 is a detail view of the circulating-pump and by-pass for regulating the speed of circulation. Fig. 4 is a detail of the valve for regulating the steam-supply to the condenser-pumps. Fig. 5 is a diagrammatic section of a complete primary boiler or boiler-condenser. Fig. 6 is a side view of one of the boiler-sections, showing a simple embodiment of the principle. Fig. 7 is a cross-section of the same. Figs. 8, 9, and 10 show modified constructions for the boiler-sections, Figs. 9 and 10 showing the preferred forms.

Referring to said drawings, there is shown in Fig. 1 a step-series engine in which the circulating fluid, heated in the heater H, passes through the circulating-pipe V and the expansion-tank T to the primary boiler B, and is thence returned to the heater through the cold circulation-pipe V', the circulation being maintained by the circulating-pump P, placed on the cold circulation-pipe V'. The steam from the boiler B passes through the pipe $a$ to the first engine E, and the exhaust from this engine passes to the boiler-condenser B' C, from which the condensed steam is pumped back to the primary boiler B through the pipe $c$ by the pump P'. The steam from boiler-condenser B' C passes through the pipe $a'$ to the second engine E', and the exhaust from this second engine through the pipe $b'$ to the second boiler-condenser B$^2$ C', from which the condensed steam is returned to the first boiler-condenser through the pipe $c'$ by pump P$^2$. The steam from the second boiler-condenser B$^2$ C' passes through the pipe $a^2$ to the third engine, and the condensed steam is returned to the second boiler-condenser through pipe $c^2$, and so on through any number of steps to the final boiler-condenser, from which the steam passes through the pipe $a^n$ to the final engine E$^n$ and the exhaust through the pipe $b^n$ to the condenser C, the condensed steam being returned through the pipe $c^n$ by the pump P$^n$. This final condenser C is preferably of the same size and form as the boiler-condensers and uses any suitable condensing fluid, which is admitted through the pipe shown at the bottom and passes out of the top of the condenser. The gases of combustion are or may be passed through or around the successive boilers by extending the stack L of the heater H by a pipe L' through the steam-space at the top of the boilers, as shown in dotted lines in this figure, care being taken not to permit the temperature of these gases when thus used to rise above a certain moderate and regulated temperature, which may be secured either by manual or automatic regulation. The apparatus thus far described in general will now be described in detail.

Externally the heater H may be of any construction, and if the anthracite is preferably of the ordinary base-burner variety, as shown, provided with a fire-box A, fed from the central magazine D, and provided with a rocking grate, the cold circulating fluid enters from the pipe V' at the base of the heater, passes upward through the double coil of pipes V about the vertical partition S to the top of the heater, thence downward outside the heater in the pipe V into the annular fire-pot chamber F, whence it passes upward through the inner vertical pipes V to the top annular or manifold G, and is thence passed through the circulating-pipe V beyond G, to the expansion-tank and primary boiler. The air which supports combustion enters directly under the grate through passage I, and the air which serves to insure complete combustion and dilute the gases and to check the fire when desired enters above the fire-pot through the passage I', these passages being controlled, respectively, by flap-dampers $d\,d'$. Above the fire-pot is the perforated shield $e$, above which the gases of combustion are deflected outward by the cone K between the pipes V connecting the manifolds F G, and then pass upward over the partition S and downward between and about the coil of pipes V, entering the flue L at base of the furnace. In case the fires are giving out too much heat, however, as is assumed in Fig. 1, a thermostatically-controlled damper $f$ opens a direct connection M for the escape of the gases to the flue. For the control of the devices for regulating the maximum temperature of the circulating fluid I have shown a simple thermostat placed between the heater H and expansion-tank T, consisting of a stout wooden rod T$h$ parallel with and adjacent to the circulating-pipe V, this part of the pipe V being formed, preferably, of a brass or copper tube, which expands largely, so that the relative length of the tube and rod forms a positive, simple, and powerful thermostat. A thermostat-lever N is pivoted upon the end of the rod T$h$, its short arm being connected to the pipe V and its long arm connected by a chain 10 to one end of a weighted lever $g$, connected by another chain 10 to a bell-crank lever $h$, from one end of which a connecting rod or rods 11 run to the dampers $d\,d'$ and from the other end of which a connecting-rod 12 runs to the damper $f$. The relative times of opening and closing the dampers $d$, $d'$, and $f$ may be adjusted as desired, as by lost-motion connections in case a single connection from lever N is used, the rod 11 being shown as passing through a weighted arm on damper $d'$ and carrying a stop, by which this arm is raised and the valve closed against the weight, which operates to open the damper as the temperature rises.

The particular form of the connections may be varied to suit mechanical convenience.

The connections between the thermostat and grate-shaker are shown in Fig. 2, the grate being actuated by a crank-arm 13, connected by a link 14 to a crank-arm 15 on a crown-wheel $i$, which is mounted in a frame $k$, pivoted to a fixed part of the construction and connected either to the rod 11 or, as shown for the sake of clearness, connected by an independent rod 16 to the weighted lever $g$.

The crown-wheel $i$, when in its proper position, engages the worm $l$, driven continuously by suitable connections with the engine or an independent motor, the throwing of the wheel into and out of contact with the worm $l$ being made instantaneous—for instance, by a bent spring 9 engaging the end of the frame $k$, as shown, the spring resisting and preventing the movement of the frame $k$ in either direction until its resistance is overcome, when the frame moves quickly, the resistance of the spring being regulated by an adjusting-screw 50.

The thermostat is shown as controlling also a safety-valve $t$ on the expansion-tank T, this valve $t$ being normally closed by a weighted arm 47, through which passes the rod 48, connected to the lever N, the rod 48 being provided with a stop which engages the weighted arm 47 to raise and open the valve $t$ at the proper time, the valve being closed by the weight. This same rod 48 may operate also the three-way valve $x$, serving to control the secondary circulation through the evaporative tank Z, and is thus shown, valve-stem 49 being weighted and the rod 48 passing through it and being provided with a stop to actuate it, as in the case of the valve $t$, the valve being shifted so as to open and close pipe $V^2$, and thus close and open pipe V to the boiler, by the stop and weighted arm as the temperature rises and falls. At the lower end of the pipe $V^2$ valve $y$ is placed to close the connection between the cold circulation and the evaporative tank, which valve need only be a check-valve of any suitable form, permitting liquid to pass freely from the evaporative tank to the pipe $V'$, but not in the opposite direction. It will be understood that all these various valves and dampers for regulating the maximum temperature and connections therewith to the thermostat may be of any suitable form and that any other suitable form of thermostat or pressure-regulator may be used. The construction shown is simply illustrative and largely diagrammatic. It will be seen from the above description that this maximum temperature or hot thermostat, as shown, regulates the maximum temperature of the circulating fluid through the fuel supply by disconnecting the grate-shaker, through the air supply by first closing the damper $d$ and then opening damper $d'$, by wasting the gases of combustion by opening damper $f$, by diverting the circulating fluid into an evaporative tank, and by opening a safety-valve positively, the order stated being that in which the motions occur, starting as the heat increases, the position of the parts in the drawings being that at which the temperature has risen to a point where the regulating devices connected with the heater are brought into action, but before the shifting of the circulation or opening of the safety-valve. These several safeguards may come into action at intervals of 5° to 10° centigrade or other suitable intervals, as desired.

An ordinary loaded safety-valve should be added for safety in case these features should fail to act.

From the expansion-tank T the circulating fluid passes through pipe V to the primary boiler B, and, after passing through the boiler, leaves the latter at its base and then passes through the cold circulation-pipe $V'$ to a circulating-pump P, which, as shown, consists of a chamber or enlargement of the pipe $V'$, in which runs a screw or other force-pump Q, which may be driven in any suitable manner, a belt and pulley $r$ being shown for this purpose. Upon the pipe $V'$, between the boiler and circulating-pump P, is placed the minimum temperature or cold thermostat $Th'$, by which the speed of circulation of the circulating fluid, and consequently the minimum temperature, is controlled, this thermostat being of the same construction as the maximum thermostat $Th$ and consisting of a wooden rod on which the lever $N'$ is pivoted, this lever being connected to the pipe $V'$ at a short distance from the pivot and at its outer end being connected to and operating the lever 17, which is connected by a link 18 to a valve $s$, which is preferably a sliding gridiron-valve, as shown, controlling the by-pass 19, which extends from the front to the rear of the screw Q within the chamber on pipe $P'$, all as shown in detail in Fig. 3. The required regulation of speed is thus secured without any regulating-valve on pipe $V'$ or means for varying the speed of the screw Q. When the temperature falls to the minimum, this valve $s$ closes the by-pass, so as to increase the speed of circulation, and as the temperature rises the valve is opened, so as to allow a part of the circulating fluid to pass through the by-pass 19 from front to rear of the screw, and thus check the speed of circulation and decrease the amount of heat delivered by the circulating fluid to the boiler.

The boiler may be of any other form suitable for use with a circulating fluid and improved results be attained from the use of such fluid whether the fluid be applied from top to bottom of the working substance or not. It is preferable, however, as above stated, that the circulating fluid should enter at or near the top and pass downward through small uniformly-distributed and closely-spaced heating-passages having thin heat-transmitting walls to a point at or near the bottom, while the working substance enters at or near the bottom and passes upward to a steam-escape at or near the top, and for such a boiler the constructions shown in detail in Figs. 5 to 10 offer many advantages, especially in cheapness and convenience of manufacture, and these constructions will now be described in detail.

It will be understood that the construction of the primary boiler B may not be the same as that of the boilers used in the lower steps of the process and that the condenser C at the low-temperature end of the engine may also differ in form from the boiler-condensers; but as the construction which is preferably used for the boiler-condensers forms, also, the most desirable construction for the primary boiler and the final condenser it will be assumed that the same construction is used throughout, and a single description of the first boiler-condenser will apply to all, and in this description and the claims the term "boiler" will be used as meaning an apparatus for the transfer of heat from one fluid to another and as applying to either the primary boiler, a boiler-condenser, or the final condenser.

The boiler is preferably formed of a series of sections, each section consisting of a pair of plates indented or corrugated, so as to form one or more continuous passages between them extending in a serpentine path downward from top to bottom through the section, each one of these sections U connecting at the top through one or more pipes 21 with the pipe $b$, through which the exhaust from the engine E is introduced, and at the bottom by one or more pipes 22 with pipe $c$, through which the condensed exhaust is returned by the feed-pump P' to the preceding boiler. These sections are nested closely together, as shown in Fig. 5, though this arrangement may be varied, and are spaced preferably from one-eighth to one-quarter of an inch between centers, though this also may be varied considerably and in such a manner as to leave irregular passage-ways of very limited width between them, through which passage-ways the working substance passes from the bottom to the top of the boiler, the working substance being fed in at the bottom of the boiler through the pipe $c'$ and the vapor passing out from the top of the boiler through the steam-pipe $a'$ to the engine E'. In boilers of this type having little or no steam-space it is expedient that the steam-pipe should be exceptionally large, as shown in the drawings, in order to contain a little store of vapor for two or three strokes, as well as to avoid wire-drawing. At the bottom of the boiler it is preferable to leave plenty of space to accommodate the pipe $c$, as it is desirable to have this room for the condensed fluid to distribute itself equally, and for the same reason it is desirable to have some space about the pipe $b$ at the top of the boiler, though it need be only large enough to give an even draft of steam from all over the top of the boiler, and the domed form shown in Fig. 1 is desirable for this purpose. The construction of the sections of such boilers in detail is shown in Figs. 6 to 10, Figs. 6 to 8 illustrating a simple form and shown especially to bring out the principle clearly, Figs. 9 and 10 showing more desirable constructions. To form the construction shown in Figs. 6 to 8, I take thin copper or other metallic plates and corrugate them in such a manner that when the plates are assembled face to face into the sections above described, consisting of two faced plates, the corrugations form from one to ten continuous serpentine tubular passages extending from the top tube or tubes 21 to the bottom tube or tubes 22 previously described. The plates forming a section are preferably brazed together only at the edges, and until these sections are assembled together into a boiler and subjected to the excess of external or collapsing pressure which naturally obtains under their conditions of use the formation of the tubes may be quite imperfect, so that the interior space is rather a single open chamber than a series of tubes; but the slightest excess of external pressure brings the flat surfaces into quite close contact, as shown on a much enlarged scale in Fig. 8, with the result that the serpentine tubes are practically tight against any slight difference of pressure, and all or nearly all the exhaust is compelled to follow the much-elongated path indicated in Fig. 6. It does not matter if a little of the exhaust should fail to do so, but pass across from tube to tube through some slight aperture caused by the plates not being in perfect contact. As there is only a very small difference of pressure between adjacent tubes and light plates are very forcibly compressed by a considerable excess of external pressure—perhaps one hundred to two hundred pounds per square inch—this can rarely happen in any degree.

Although an excess of external pressure is the usual rule, however it may and does happen in special cases that an excess of internal pressure is convenient. In this case the interior serpentine circulation may be a little less perfect, since the relative pressures tend to destroy instead of perfect the metallic surface-contacts which form the tubes; but to the end that there may be no practical difference between the two cases I preferably provide, by spacing-teats or otherwise, that the adjacent sections may be in contact at frequent points, and by assembling the boiler under a moderate initial pressure, which is maintained within the boiler-shell by suitable end plates or spaces, I arrange that no plate can move injuriously from or into contact with its neighbors under either external or internal excess of pressure. The position of these spacing-teats is indifferent.

It is important to provide more or less of a flat bearing-surface where the two plates of a section come in contact, as shown in Fig. 8, and not to make these bearings mere rounded knuckle edges, as in the latter case external pressure tends to cause these surfaces to slip past each other if they are in the least degree out of position, and the section is collapsible by much less pressure.

In Fig. 9 is shown a preferred construction embodying an important practical feature. The form of corrugated plate shown in Fig. 6 is weak in this, that the straight cylindrical tubes at top and bottom of the section, which, in effect, become semicircular arches when subjected to pressure, have no abutment along the outer edge, except the very slight resistance of the brazed edge to being sprung outward from a straight line. Such a construction therefore, although functionally perfect, is mechanically defective. To obviate this, and at the same time secure further advantages, I prefer in all cases to form the tubes of a series of intersecting hemispheres or spheroids indented in the plate instead of forming them of semicylinders, as shown in Fig. 6. The sphere is the strongest form in which sheet metal can be disposed to resist pressure, and the strength of the outer tubes is increased from ten to twenty fold by this simple change. Moreover, the tube thus formed, having an irregular cross-section alternately contracted and expanded, produces a sort of whirling action in the fluids on both sides of it, which I have found to increase very largely the rate of heat transfer under thermally-similar conditions. For this reason, as well as for the sake of greater strength, I prefer to form all the tubes of these intersecting spheres or spheroids. As even then the outer tubes are weaker, I extend this principle for the outer tubes at least, and for all the tubes, if desired, by staggering the spheres or spheroids in the manner shown in Fig. 10, so as to give a continuous zigzag form to the tube, with the center of a sphere or spheroid at each angle. This still further improves the functional action of the tubes as heating-surfaces and gives an extraordinary strength and stiffness to the tubes, so that the outer ones are as strong as any others and all will resist some thousands of pounds per square inch pressure, although formed of quite thin copper, if the size of the spheres or spheroids is not more than one-quarter inch diameter, with connecting intersections of about one-eighth inch diameter, which are the proportions which at the present time I deem most suitable, though further experience may modify this view by showing that larger or smaller dimensions will give still better results.

It will be understood that the constructions illustrated are only some of the preferred forms of plate-boilers which may embody the invention, considered broadly. Thus instead of forming the passages by indentations or corrugations a boiler may be made of parallel plates held apart by indentations or corrugations or otherwise and the spaces between the plates form the passages for the heating fluid and fluid to be heated, alternate spaces connecting with the supply-spaces for the respective fluids.

The condensed vapor from each boiler-condenser is preferably returned to its boiler by the feed-pumps P' P², &c., through the feed-pipes c, &c.; but this return may be omitted on some or all of the boiler-condensers, if found desirable for any reason. As above stated, it is desirable that means should be provided for regulating the volume of working substance in the primary boiler and boiler-condensers, and this may readily be done in the construction shown by regulating the supply of steam to the feed-pump. A simple construction for this purpose is shown in Figs. 1 to 4, in which a steam-pipe 23 connects with the top of the boiler through chamber 24, connected with the boiler by pipe 25, so that the level of the water in the chamber varies with that in the boiler. Within this chamber 24 is a small ball-float m, which is arranged to close pipe 23 and cut off the steam supply in its upper position and open the pipe through the chamber to supply steam to the feed-pump when lowered by the fall of the water in the boiler. A water-blow-off valve 27 is also preferably used when a liquid working substance is employed, through which valve an excessive boiler-pressure will blow back all or part of the liquid in the boiler or boiler-condenser into the succeeding boiler-condenser, and thus secure a regulation of the pressure independently of the safety-valve. This blow-off valve 27 may be of any type which opens at a fixed interior pressure and closes when that pressure ceases and may be introduced at any point where it is in open connection with the bottom of the boiler, either on the feed-pipe, as shown, or on a branch pipe.

While the boiler claimed herein has been described in connection with its application in a step-series engine and with a fluid heating agent of a moderate and controlled temperature, it will be understood that a boiler constructed as described and claimed is of more general application and in itself forms a part of the invention.

The primary boiler process and boiler described, the means for employing the waste gases of combustion, and a boiler having the functional features described are claimed only in a step-series process or engine, as these subjects-matter are claimed, broadly, in other applications.

The present application is limited to the features of invention pointed out by the claims, and the pressure-generating process described herein in connection with the primary boiler process and apparatus for carrying out the same, together with the process of applying the heating agents to the working substances in the boilers described herein, and a boiler embodying the process features described herein are claimed, broadly, in other applications—Serial No. 499,531, filed February 8, 1894, and Serial No. 515,477, filed June 23, 1894.

What I claim is—

1. The step-series engine process, which consists in passing a circulating fluid from a supply or source of heat to a pressure generator thermally dissociated from the supply or source of heat and containing a working substance, heating the working substance by the surrender of heat thereto from the circulating fluid, applying the working substance in an expansion engine, applying the exhaust from said engine to heating a second working substance, applying said second working substance in a second expansion engine, and so on, if desired, for other steps, substantially as described.

2. The step-series engine process which consists in passing a circulating fluid at a regulated temperature from a supply or source of heat to a pressure generator thermally dissociated from the supply or source of heat and containing a working substance, heating the working substance by the surrender of heat thereto from the circulating fluid, applying the working substance in an expansion engine, applying the exhaust from said engine to heating a second working substance, applying said second working substance in a second expansion engine, and so on, if desired, for other steps, substantially as described.

3. The step-series engine process, which consists in passing a circulating fluid from a supply or source of heat to a pressure generator thermally dissociated from the supply or source of heat and containing a working substance, regulating the maximum temperature of the circulating fluid, heating the working substance by the surrender of heat thereto from the circulating fluid, applying the working substance in an expansion engine, applying the exhaust from said engine to heating a second working substance, applying said second working substance in a second expansion engine, and so on, if desired, for other steps, substantially as described.

4. The step-series engine process, which consists in passing a circulating fluid from a supply or source of heat to a pressure generator thermally dissociated from the supply or source of heat and containing a working substance, regulating the minimum temperature of the circulating fluid, heating the working substance by surrender of heat thereto from the circulating fluid, applying the working substance in an expansion engine, applying the exhaust from said engine to heating a second working substance, applying said second working substance in a second expansion engine, and so on, if desired, for other steps, substantially as described.

5. The step-series engine process, which consists in passing a circulating fluid from a supply or source of heat to a pressure generator thermally dissociated from the supply or source of heat and containing a working substance, regulating the maximum and minimum temperature of the circulating fluid, heating the working substance by the surrender of heat thereto from the circulating fluid, applying the working substance in an expansion engine, applying the exhaust from said engine to heating a second working substance, applying said second working substance in a second expansion engine, and so on, if desired, for other steps, substantially as described.

6. The step-series engine process, which consists in passing a circulating fluid at a regulated speed from a supply or source of heat to a pressure generator thermally dissociated from the supply or source of heat and containing a working substance, heating the working substance by the surrender of heat thereto from the circulating fluid, applying the working substance in an expansion engine, applying the exhaust from said engine to heating a second working substance, applying said second working substance in a second expansion engine, and so on, if desired, for other steps, substantially as described.

7. The step-series engine process, which consists in passing a circulating fluid at a regulated speed from a supply or source of heat to a pressure generator thermally dissociated from the supply or source of heat and containing a working substance, regulating the maximum temperature of the circulating fluid, heating the working substance by surrender of heat thereto from the circulating fluid, applying the working substance in an expansion engine, applying the exhaust from said engine to heating a second working substance, applying said second working substance in a second expansion engine, and so on, if desired, for other steps, substantially as described.

8. The step-series engine process, which consists in passing a circulating fluid from a supply or source of heat to a pressure generator thermally dissociated from the supply or source of heat and containing a working substance, heating the working substance by the surrender of heat thereto from the circulating fluid, applying the working substance in an expansion engine, applying the exhaust from said engine to heating a second working substance, applying said second working substance in a second expansion engine, regulating the quantity of each working substance to maintain the working volume substantially constant, and so on, if desired, for other steps, substantially as described.

9. The step-series engine process, which consists in passing a circulating fluid from a supply or source of heat to a pressure generator thermally dissociated from the supply or source of heat and containing a working substance, heating the working substance by the surrender of heat thereto from the circulating fluid, applying the working substance in an expansion engine, applying the exhaust from said engine to heating a second working substance, applying said second working substance in a second expansion engine, regulating the maximum pressure of the working substances by varying the surface exposure between the working substance and the heating substance, and so on, if desired, for other steps, substantially as described.

10. The step series engine process, which consists in passing a circulating fluid from a supply or source of heat to a pressure generator thermally dissociated from the supply or source of heat and containing a working substance, heating the working substance by the surrender of heat thereto from the circulating fluid, applying the working substance in an expansion engine, applying the exhaust from said engine to heating a second working substance, applying said second working subtance in a second expansion engine, regulating the quantity of the working substances to maintain the working volume substantially constant, regulating the maximum pressure of the working substances by varying the surface exposure between the working substance and the heating substance, and so on, if desired, for other steps, substantially as described.

11. The step-series engine process, which consists in passing a circulating fluid from a supply or source of heat to a pressure generator thermally dissociated from the supply or source of heat and containing a working substance, regulating the maximum and minimum temperature of the circulating fluid, heating the working substance by the surrender of heat thereto from the circulating fluid, applying the working substance in an expansion engine, applying the exhaust from said engine to heating a second working substance, applying said second working substance in a second expansion engine, regulating the quantity of the working substances to maintain the working volume substantially constant, and so on, if desired, for other steps, substantially as described.

12. The step series engine process, which consists in passing a circulating fluid from a supply or source of heat to a pressure generator thermally dissociated from the supply or source of heat and containing a working substance, regulating the maximum temperature and speed of the circulating fluid, heating the working substance by the surrender of heat thereto from the circulating fluid, applying the working substance in an expansion engine, applying the exhaust from said engine to heating a second working substance, applying said second working substance in a second expansion engine, regulating the quantity of the working substances to maintain the working volume substantially constant, and so on, if desired, for other steps, substantially as described.

13. The step-series engine process, which consists in passing a circulating fluid from a supply or source of heat to a pressure generator thermally dissociated from the supply or source of heat and containing a working substance, regulating the maximum and minimum temperature of the circulating fluid, heating the working substance by the surrender of heat thereto from the circulating fluid, applying the working substance in an expansion engine, applying the exhaust from said engine to heating a second working substance, applying said second working substance in a second expansion engine, regulating the quantity of the working substances to maintain the working volume substantially constant, regulating the maximum pressure of the working substances by varying the surface exposure between the working substance and the heating substance, and so on, if desired, for other steps, substantially as described.

14. The step-series engine process, which consists in passing a circulating fluid from a supply or source of heat to a pressure generator thermally dissociated from the supply or source of heat and containing a working substance, regulating the maximum temperature and speed of the circulating fluid, heating the working substance by the surrender of heat thereto from the circulating fluid, applying the working substance in an expansion engine, applying the exhaust from said engine to heating a second working substance, applying said second working substance in a second expansion engine, regulating the quantity of the working substances to maintain the working volume substantially constant, regulating the maximum pressure of the working substances by varying the surface exposure between the working substance and the heating substance, and so on, if desired, for other steps, substantially as described.

15. The step-series engine process, which consists in passing a circulating fluid from a supply or source of heat to a pressure generator thermally dissociated from the supply or source of heat and containing a working substance, applying the circulating fluid to heating the hotter and colder parts of the working substance successively by passing it downward through the pressure generator, applying the working substance in an expansion engine, applying the exhaust from said engine to heating a second working substance, applying said second working substance in a second expansion engine, and so on, if desired, for other steps, substantially as described.

16. The step-series engine process, which consists in passing a circulating fluid at a regulated temperature from a supply or source of heat to a pressure generator thermally dissociated from the supply or source of heat and containing a working substance, applying the circulating fluid to heating the hotter and colder parts of the working substance successively by passing it downward through the pressure generator, applying the working substance in an expansion engine, applying the exhaust from said engine to heating a second working substance, applying said second working substance in a second expansion engine, and so on, if desired, for other steps, substantially as described.

17. The step-series engine process, which consists in passing a circulating fluid from a supply or source of heat to a pressure generator thermally dissociated from the supply or source of heat and containing a working substance, regulating the minimum temperature of the circulating fluid, applying the circulating fluid to heating the hotter and colder parts of the working substance successively by passing it downward through the pressure generator, applying the working substance in an expansion engine, applying the exhaust from said engine to heating a second working substance, applying said second working substance in a second expansion engine, and so on, if desired, for other steps, substantially as described.

18. The step-series engine process, which consists in passing a circulating fluid at a regulated speed from a supply or source of heat to a pressure generator thermally dissociated from the supply or source of heat and containing a working substance, applying the circulating fluid to heating the hotter and colder parts of the working substance successively by passing it downward through the pressure generator, applying the working substance in an expansion engine, applying the exhaust from said engine to heating a second working substance, applying said second working substance in a second expansion engine, and so on, if desired, for other steps, substantially as described.

19. The step-series engine process, which consists in passing a circulating fluid at a regulated speed from a supply or source of heat to a pressure generator thermally dissociated from the supply or source of heat and containing a working substance, regulating the maximum temperature of the circulating fluid, applying the circulating fluid to heating the hotter and colder parts of the working substance successively by passing it downward through the pressure generator, applying the working substance in an expansion engine, applying the exhaust from said engine to heating a second working substance, applying said second working substance in a second expansion engine, and so on, if desired, for other steps, substantially as described.

20. The step-series engine process, which consists in passing a circulating fluid from a supply or source of heat to a pressure generator thermally dissociated from the supply or source of heat and containing a working substance, heating the working substance by the surrender of heat thereto from the circulating fluid, applying the working substance in an expansion engine, applying the exhaust from said engine to heating a second working substance, applying said second working substance in a second expansion engine and returning the cooled working substance to its pressure generator to be reheated, and so on, if desired, for other steps, substantially as described.

21. The step-series engine process, which consists in passing a circulating fluid from a supply or source of heat to a pressure generator thermally dissociated from the supply or source of heat and containing a working substance, heating the working substance by the surrender of heat thereto from the circulating fluid, applying the working substance in an expansion engine, applying the exhaust from said engine to heating a second working substance, applying said second working substance in a second expansion engine, regulating the quantity of the working substances to maintain the working volume substantially constant, and returning the cooled working substances to their pressure generators to be reheated, and so on, if desired, for other steps, substantially as described.

22. The step-series engine process, which consists in passing a circulating fluid from a supply or source of heat to a pressure generator thermally dissociated from the supply or source of heat and containing a working substance, heating the working substance by the surrender of heat thereto from the circulating fluid, applying the working substance in an expansion engine, applying the exhaust from said engine to heating a second working substance, applying said second working substance in a second expansion engine, regulating the maximum pressure of the working substances by varying the surface exposure between the working substance and the heating surface, and returning the cooled working substances to their pressure generators to be reheated, and so on, if desired, for other steps, substantially as described.

23. The step-series engine process, which consists in passing a circulating fluid from a supply or source of heat to a pressure generator thermally dissociated from the supply or source of heat and containing a working substance, heating the working substance by the surrender of heat thereto from the circulating fluid, applying the working substance in an expansion engine, applying the exhaust from said engine to heating a second working substance, applying said second working substance in a second expansion engine, regulating the quantity of the working substances to maintain the working volume substantially constant, regulating the maximum pressure of the working substances by varying the surface exposure between the working substance and the heating substance, and returning the cooled working substances to their pressure generators to be reheated, and so on, if desired, for other steps, substantially as described.

24. The step-series engine process, which consists in passing a circulating fluid from a supply or source of heat to a pressure generator thermally dissociated from the supply or source of heat and containing a working substance, applying the circulating fluid to heating the hotter and colder parts of the working substance successively by passing it downward through the pressure generator, applying the working substance in an expansion engine, applying the exhaust from said engine to heating the hotter and colder parts of a second working substance successively by passing it downward through said working substance, applying said second working substance in a second expansion engine, and so on, if desired, for other steps, substantially as described.

25. The step-series engine process, which consists in passing a circulating fluid from a supply or source of heat to a pressure generator thermally dissociated from the supply or source of heat and containing a working substance, applying the circulating fluid to heating the hotter and colder parts of the working substance successively by passing it downward through the pressure generator, applying the working substance in an expansion engine, applying the exhaust from said engine to heating the hotter and colder parts of a second working substance successively by passing it downward through said working substance and preventing downward circulation of the working substance, applying said second working substance in a second expansion engine, and so on, if desired, for other steps, substantially as described.

26. The step-series engine process, which consists in passing a circulating fluid from a supply or source of heat to a pressure generator thermally dissociated from the supply or source of heat and containing a working substance, applying the circulating fluid to heating the hotter and colder parts of the working substance successively by passing it downward through the pressure generator, applying the working substance in an expansion engine, applying the exhaust from said engine to heating the hotter and colder parts of a second working substance successively by passing it downward through said working substance in uniformly distributed and closely spaced passages, applying said second working substance in a second expansion engine, and so on, if desired, for other steps, substantially as described.

27. The step-series engine process, which consists in passing a circulating fluid from a supply or source of heat to a pressure generator thermally dissociated from the supply or source of heat and containing a working substance, applying the circulating fluid to heating the hotter and colder parts of the working substance successively by passing it downward through the pressure generator, applying the working substance in an expansion engine, applying the exhaust from said engine to heating the hotter and colder parts of a second working substance successively by passing it downward through said working substance in uniformly distributed and closely spaced passages having thin heat transmitting walls, applying said second working substance in a second expansion engine, and so on, if desired, for other steps, substantially as described.

28. The step-series engine process, which consists in passing a circulating fluid from a supply or source of heat to a pressure generator thermally dissociated from the supply or source of heat and containing a working substance, heating the working substance by the surrender of heat thereto from the circulating fluid, applying the working substance in an expansion engine, applying the exhaust from said engine to heating the hotter and colder parts of a second working substance successively by passing it downward through said working substance, applying said second working substance in a second expansion engine, and so on, if desired, for other steps, substantially as described.

29. The step series engine process, which consists in passing a circulating fluid from a supply or source of heat to a pressure generator thermally dissociated from the supply or source of heat and containing a working substance, heating the working substance by the surrender of heat thereto from the circulating fluid, applying the working substance in an expansion engine, applying the exhaust from said engine to heating the hotter and colder parts of a second working substance successively by passing it downward through said working substance and preventing downward circulation of the working substance, applying said second working substance in a second expansion engine, and so on, if desired, for other steps, substantially as described.

30. The step-series engine process, which consists in passing a circulating fluid from a supply or source of heat to a pressure generator thermally dissociated from the supply or source of heat and containing a working substance, heating the working substance by the surrender of heat thereto from the circulating fluid, applying the working substance in an expansion engine, applying the exhaust from said engine to heating the hotter and colder parts of a second working substance successively by passing it downward through said working substance in uniformly distributed and closely spaced passages, applying said second working substance in a second expansion engine, and so on, if desired, for other steps, substantially as described.

31. The step-series engine process, which consists in passing a circulating fluid from a supply or source of heat to a pressure generator thermally dissociated from the supply or source of heat and containing a working substance, heating the working substance by the surrender of heat thereto from the circulating fluid, applying the working substance in an expansion engine, applying the exhaust from said engine to heating the hotter and colder parts of a second working substance successively by passing it downward through said working substance in uniformly distributed and closely spaced passages having thin heat transmitting walls, applying said second working substance in a second expansion engine, and so on, if desired, for other steps, substantially as described.

32. The step-series engine process, which consists in passing a circulating fluid from a supply or source of heat to a pressure generator thermally dissociated from the supply or source of heat and containing a working substance, heating the working substance by the surrender of heat thereto from the circulating fluid, applying the working substance in an expansion engine, applying the exhaust from said engine to heating a second working substance by passing it through said working substance in passages having thin heat transmitting walls, applying said second working substance in a second expansion engine, and so on, if desired, for other steps, substantially as described.

33. The step-series engine process, which consists in passing a circulating fluid at a regulated temperature from a supply or source of heat to a pressure generator thermally dissociated from the supply or source of heat and containing a working substance, heating the working substance by the surrender of heat thereto from the circulating fluid, applying the working substance in an expansion engine, applying the exhaust from said engine to heating the hotter and colder parts of a second working substance successively by passing it downward through said working substance in uniformly distributed and closely spaced passages having thin heat transmitting walls, applying said second working substance in a second expansion engine, and so on, if desired, for other steps, substantially as described.

34. The step-series engine process, which consists in passing a circulating fluid from a supply or source of heat to a pressure generator thermally dissociated from the supply or source of heat and containing a working substance, regulating the minimum temperature of the circulating fluid, heating the working substance by the surrender of heat thereto from the circulating fluid, applying the working substance in an expansion engine, applying the exhaust from said engine to heating the hotter and colder parts of a second working substance successively by passing it downward through said working substance in uniformly distributed and closely spaced passages having thin heat transmitting walls, applying said second working substance in a second expansion engine, and so on, if desired, for other steps, substantially as described.

35. The step-series engine process, which consists in passing a circulating fluid from a supply or source of heat to a pressure generator thermally dissociated from the supply or source of heat and containing a working substance, regulating the maximum and minimum temperature of the circulating fluid, heating the working substance by the surrender of heat thereto from the circulating fluid, applying the working substance in an expansion engine, applying the exhaust from said engine to heating the hotter and colder parts of a second working substance successively by passing it downwardly through said working substance in uniformly distributed and closely spaced passages having thin heat transmitting walls, applying said second working substance in a second expansion engine, and so on, if desired, for other steps, substantially as described.

36. The step-series engine process, which consists in passing a circulating fluid at a regulated speed from the supply or source of heat to a pressure generator thermally dissociated from a supply or source of heat and containing a working substance, heating the working substance by the surrender of heat thereto from the circulating fluid, applying the working substance in an expansion engine, applying the exhaust from said engine to heating the hotter and colder parts of a second working substance successively by passing it downward through said working substance in uniformly distributed and closely spaced passages having thin heat transmitting walls, applying said second working substance in a second expansion engine, and so on, if desired, for other steps, substantially as described.

37. The step-series engine process, which consists in passing a circulating fluid from a supply or source of heat to a pressure generator thermally dissociated from the supply or source of heat and containing a working substance, regulating the maximum temperature and speed of the circulating fluid, heating the working substance by the surrender of heat thereto from the circulating fluid, applying the working substance in an expansion engine, applying the exhaust from said engine to heating the hotter and colder parts of a second working substance successively by passing it downward through said working substance in uniformly distributed and closely spaced passages having thin heat transmitting walls, applying said second working substance in a second expansion engine, and so on, if desired, for other steps, substantially as described.

38. The step-series engine process, which consists in passing a circulating fluid from a supply or source of heat to a pressure generator thermally dissociated from the supply or source of heat and containing a working substance, regulating the maximum temperature and speed of the circulating fluid, applying the circulating fluid to heating the hotter and colder parts of the working substance successively by passing it downward through the pressure generator, applying the working substance in an expansion engine, applying the exhaust from said engine to heating the hotter and colder parts of a second working substance successively by passing it downward through said working substance in uniformly distributed and closely spaced passages having thin heat transmitting walls, applying said second working substance in a second expansion engine, and so on, if desired, for other steps, substantially as described.

39. The step-series engine process, which consists in generating or increasing vapor pressure in a working substance, applying said working substance in an expansion engine, applying the exhaust from said engine to heating a second working substance by passing it downward through the working substance, and so on, if desired, for other steps, substantially as described.

40. The step-series engine process, which consists in generating or increasing vapor pressure in a working substance, applying said working substance in an expansion engine, applying the exhaust from said engine to heating a second working substance by passing it downward through the working substance and returning the cooled exhaust to its pressure generator to be reheated, and so on, if desired, for other steps, substantially as described.

41. The step-series engine process, which consists in generating or increasing vapor pressure in a working substance, applying said working substance in an expansion engine, applying the exhaust from said engine to heating a second working substance by passing it downward through the working substance and preventing downward circulation of the working substance, and so on, if desired, for other steps, substantially as described.

42. The step-series engine process, which consists in generating or increasing vapor pressure in a working substance, applying said working substance in an expansion engine, applying the exhaust from said engine to heating a second working substance by passing it downward through the working substance in uniformly distributed and closely spaced passages, and so on, if desired, for other steps, substantially as described.

43. The step-series engine process, which consists in generating or increasing vapor pressure in a working substance, applying said working substance in an expansion engine, applying the exhaust from said engine to heating a second working substance by passing it downward through the working substance in uniformly distributed and closely spaced passages extending horizontally through successive layers of the working substance, and so on, if desired, for other steps, substantially as described.

44. The step-series engine process, which consists in generating or increasing vapor pressure in a working substance, applying said working substance in an expansion engine, applying the exhaust from said engine to heating a second working substance by passing it downward through the working substance in uniformly distributed and closely spaced passages extending horizontally through successive layers of the steam space and working substance, and so on, if desired, for other steps, substantially as described.

45. The step-series engine process, which consists in generating or increasing vapor pressure in a working substance, applying said working substance in an expansion engine, applying the exhaust from said engine to heating a second working substance by passing it through the working substance in passages having thin heat transmitting walls, and so on, if desired, for other steps, substantially as described.

46. The step-series engine process, which consists in generating or increasing vapor pressure in a working substance, applying said working substance in an expansion engine, applying the exhaust from said engine to heating a second working substance by passing it through the working substance in small closely spaced passages having thin heat transmitting walls, and so on, if desired, for other steps, substantially as described.

47. The step-series engine process, which consists in generating or increasing vapor pressure in a working substance, applying said working substance in an expansion engine, applying the exhaust from said engine to heating a second working substance by passing it downward through the working substance in small closely spaced passages having thin heat transmitting walls, and so on, if desired, for other steps, substantially as described.

48. The step-series engine process, which consists in generating or increasing vapor pressure in a working substance, applying said working substance in an expansion engine, applying the exhaust from said engine to heating a second working substance by passing it downward through the working substance in passages having thin heat transmitting walls and preventing downward circulation of the working substance, and so on, if desired, for other steps, substantially as described.

49. The step-series engine process, which consists in generating or increasing vapor pressure in a working substance, applying said working substance in an expansion engine, applying the exhaust from said engine to heating a second working substance by passing it downward through the working substance in uniformly distributed and closely spaced passages having thin heat transmitting walls, and so on, if desired, for other steps, substantially as described.

50. The step-series engine process, which consists in generating or increasing vapor pressure in a working substance, applying said working substance in an expansion engine, applying the exhaust from said engine to heating a second working substance by passing it downward through the working substance in uniformly distributed and closely spaced passages extending horizontally through successive layers of the working substance and having thin heat transmitting walls, and so on, if desired, for other steps, substantially as described.

51. The step series engine process, which consists in generating or increasing vapor pressure in a working substance, applying said working substance in an expansion engine, applying the exhaust from said engine to heating a second working substance by passing it downward through the working substance in uniformly distributed and closely spaced passages extending horizontally through successive layers of the steam space and working substance and having thin heat transmitting walls, and so on, if desired, for other steps, substantially as described.

52. The step-series engine process, which consists in generating or increasing vapor pressure in a working substance, applying said working substance in an expansion engine, applying the exhaust from said engine to heating a second working substance by passing it downward through the working substance in small uniformly distributed and closely spaced passages having thin heat transmitting walls, and so on, if desired, for other steps, substantially as described.

53. In a step-series engine, the combination with a heater, of a pressure generator thermally dissociated from the heater for applying a circulating fluid to heating a working substance, connections from the heater to the pressure generator for the circulating fluid, an expansion engine operated by said working substance, one or more secondary pressure generators and expansion engines, and connections for the exhaust from the expansion engines to the next pressure generator, substantially as described.

54. In a step-series engine, the combination with a heater, of a pressure generator thermally dissociated from the heater for applying a circulating fluid to heating a working substance, connections from the heater to the pressure generator for the circulating fluid, means for regulating the temperature of the circulating fluid, an expansion engine operated by said working substance, one or more secondary pressure generators and expansion engines, and connections for the exhaust from the expansion engines to the next pressure generator, substantially as described.

55. In a step-series engine, the combination with a heater, of a pressure generator thermally dissociated from the heater for applying a circulating fluid to heating a working substance, connections from the heater to the pressure generator for the circulating fluid, means for regulating the minimum temperature of the circulating fluid, an expansion engine operated by said working substance, one or more secondary pressure generators and expansion engines, and connections for the exhaust from the expansion engines to the next pressure generator, substantially as described.

56. In a step-series engine, the combination with a heater, of a pressure generator thermally dissociated from the heater for applying a circulating fluid to heating a working substance, connections from the heater to the pressure generator for the circulating fluid, means for regulating the maximum and minimum temperature of the circulating fluid, an expansion engine operated by said working substance, one or more secondary pressure generators and expansion engines, and connections for the exhaust from the expansion engines to the next pressure generator, substantially as described.

57. In a step-series engine, the combination with a heater, of a pressure generator thermally dissociated from the heater for applying a circulating fluid to heating a working substance, connections from the heater to the pressure generator and return to heater for the circulating fluid, an expansion engine operated by said working substance, one or more secondary pressure generators and expansion engines, and connections for the exhaust from the expansion engines to the next pressure generator, substantially as described.

58. In a step-series engine, the combination with a heater, of a pressure generator thermally dissociated from the heater for applying a circulating fluid to heating a working substance, connections from the heater to the pressure generator and return to heater for the circulating fluid, a circulating pump, an expansion engine operated by said working substance, one or more secondary pressure generators and expansion engines, and connections for the exhaust from the expansion engines to the next pressure generator, substantially as described.

59. In a step-series engine, the combination with a heater, of a pressure generator thermally dissociated from the heater for applying a circulating fluid to heating a working substance, connections from the heater to the pressure generator and return to heater for the circulating fluid, means for regulating the temperature of the circulating fluid, an expansion engine operated by said working substance, one or more secondary pressure generators and expansion engines, and connections for the exhaust from the expansion engines to the next pressure generator, substantially as described.

60. In a step-series engine, the combination with a heater, of a pressure generator thermally dissociated from the heater for applying a circulating fluid to heating a working substance, connections from the heater to the pressure generator and return to heater for the circulating fluid, means for regulating the minimum temperature of the circulating fluid, an expansion engine operated by said working substance, one or more secondary pressure generators and expansion engines, and connections for the exhaust from the expansion engines to the next pressure generator, substantially as described.

61. In a step-series engine, the combination with a heater, of a pressure generator thermally dissociated from the heater for applying a circulating fluid to heating a working substance, connections from the heater to the pressure generator and return to heater for the circulating fluid, means for regulating the maximum and minimum temperature of the circulating fluid, an expansion engine operated by said working substance, one or more secondary pressure generators and expansion engines, and connections for the exhaust from the expansion engines to the next pressure generator, substantially as described.

62. In a step-series engine, the combination with a heater, of a pressure generator thermally dissociated from the heater for applying a circulating fluid to heating a working substance, connections from the heater to the pressure generator and return to heater for the circulating fluid, means for regulating the circulating speed of the circulating fluid, an expansion engine operated by said working substance, one or more secondary pressure generators and expansion engines, and connections for the exhaust from the expansion engines to the next pressure generator, substantially as described.

63. In a step-series engine, the combination with a heater, of a pressure generator thermally dissociated from the heater for applying a circulating fluid to heating a working substance, connections from the heater to the pressure generator for the circulating fluid, secondary connections for the circulating fluid cutting out the pressure generator, means for controlling said secondary connections, an expansion engine operated by said working substance, one or more secondary pressure generators and expansion engines, and connections for the exhaust from the expansion engines to the next pressure generator, substantially as described.

64. In a step-series engine, the combination with a heater, of a pressure generator thermally dissociated from the heater for applying a circulating fluid to heating a working substance, connections from the heater to the pressure generator for the circulating fluid, an expansion engine operated by said working substance, one or more secondary pressure generators and expansion engines, connections for the exhaust from the expansion engines to the next pressure generator, and means for regulating the quantity of the working substances in the pressure generators to maintain a substantially constant volume, substantially as described.

65. In a step-series engine, the combination with a heater, of a pressure generator thermally dissociated from the heater for applying a circulating fluid to heating a working substance, connections from the heater to the pressure generator for the circulating fluid, an expansion engine operated by said working substance, one or more secondary pressure generators and expansion engines, connections for the exhaust from the expansion engines to the next pressure generator, means for regulating the pressure in the pressure generators by varying the surface exposure between the working substance and the heating substance, substantially as described.

66. In a step-series engine, the combination with a heater, of a pressure generator thermally dissociated from the heater for applying a circulating fluid to heating a working substance, connections from the heater to the pressure generator for the circulating fluid, an expansion engine operated by said working substance, one or more secondary pressure generators and expansion engines, connections for the exhaust from the expansion engines to the next pressure generator, means for regulating the quantity of working substance in the pressure generators to maintain a substantially constant volume, and means for regulating the pressure in the pressure generators by varying the surface exposure between the working substance and the heating substance, substantially as described.

67. In a step-series engine, the combination with a heater, of a pressure generator thermally dissociated from the heater for applying a circulating fluid to heating a working substance, connections from the heater to the pressure generator for the circulating fluid, an expansion engine operated by said working substance, one or more secondary pressure generators and expansion engines, connections for the exhaust from the expansion engines to the next pressure generator, and means for returning the cooled exhaust to the pressure generators to be reheated, substantially as described.

68. In a step-series engine, the combination with a heater, of a pressure generator thermally dissociated from the heater for applying a circulating fluid to heating a working substance, connections from the heater to the pressure generator for the circulating fluid, an expansion engine operated by said working substance, one or more secondary pressure generators and expansion engines, connections for the exhaust from the expansion engines to the next pressure generator, means for returning the cooled exhaust to the pressure generators to be reheated, and means for regulating the volume of the working substance in the pressure generators to maintain a substantially constant volume, substantially as described.

69. In a step-series engine, the combination with a heater, of a pressure generator thermally dissociated from the heater for applying a circulating fluid to heating a working substance, connections from the heater to the pressure generator for the circulating fluid, an expansion engine operated by said working substance, one or more secondary pressure generators and expansion engines, connections for the exhaust from the expansion engines to the next pressure generator, means for returning the cooled exhaust to the pressure generators to be reheated, and means for regulating the pressure in the pressure generators by varying the surface exposure between the working substance and heating substance, substantially as described.

70. In a step-series engine, the combination with a heater, of a pressure generator thermally dissociated from the heater for applying a circulating fluid to heating a working substance, connections from the heater to the pressure generator for the circulating fluid, an expansion engine operated by said working substance, one or more secondary pressure generators and expansion engines, connections for the exhaust from the expansion engines to the next pressure generator, means for returning the cooled exhaust to the pressure generators to be reheated, means for regulating the volume of the working substance in the pressure generators to maintain a substantially constant volume, and means for regulating the pressure in the pressure generators by varying the surface exposure between the working substance and the heating substance, substantially as described.

71. In a step-series engine, the combination with a heater, of a pressure generator thermally dissociated from the heater for applying a circulating fluid to heating a working substance, connections from the heater to the pressure generator for the circulating fluid, an expansion engine operated by said working substance, one or more secondary pressure generators and expansion engines, connections for the exhaust from the expansion engines to the next pressure generator, means for returning the cooled exhaust to the pressure generators to be reheated, and liquid blow-off valves for the pressure generators through which working substance is blown back to the pressure generator in which it was cooled on an excess of pressure in the pressure generator in which it is heated, substantially as described.

72. In a step-series engine, the combination with a heater, of a pressure generator thermally dissociated from the heater for applying a circulating fluid to heating a working substance, connections from the heater to the pressure generator for the circulating fluid, an expansion engine operated by said working substance, one or more secondary pressure generators and expansion engines, connections for the exhaust from the expansion engines to the next pressure generator, means for returning the cooled exhaust to the pressure generators to be reheated, means for regulating the volume of the working substance in the pressure generators to maintain a substantially constant volume, and liquid blow-off valves for the pressure generators through which working substance is blown back to the pressure generator in which it was cooled on an excess of pressure in the pressure generator in which it is heated, substantially as described.

73. In a step-series engine, the combination with a heater, of a pressure generator thermally dissociated from the heater and having uniformly distributed and closely spaced passages extending downward through the working substance, connections between the heater and said passages at the top of the pressure generator for the circulating fluid, an expansion engine operated by said working substance, one or more secondary pressure generators and expansion engines, and connections for the exhaust from the expansion engines to the next pressure generator, substantially as described.

74. In a step-series engine, the combination with a heater, of a pressure generator thermally dissociated from the heater and having uniformly distributed and closely spaced passages extending horizontally and downward through successive layers of the working substance, connections between the heater and said passages at the top of the pressure generator for the circulating fluid, an expansion engine operated by said working substance, one or more secondary pressure generators and expansion engines, and connections for the exhaust from the expansion engines to the next pressure generator, substantially as described.

75. In a step-series engine, the combination with a heater, of a pressure generator thermally dissociated from the heater and having uniformly distributed and closely spaced passages extending horizontally and downward through successive layers of the steam space and working substance, connections between the heater and said passages at the top of the pressure generator for the circulating fluid, an expansion engine operated by said working substance, one or more secondary pressure generators and expansion engines, and connections for the exhaust from the expansion engines to the next pressure generator, substantially as described.

76. In a step-series engine, the combination with a heater, of a pressure geneartor thermally dissociated from the heater and having uniformly distributed and closely spaced passages extending downward through the working substance, connections between the heater and said passages at the top of the pressure generator for the circulating fluid, an expansion engine operated by said working substance, one or more secondary pressure generators having uniformly distributed and closely spaced passages extending downward through the working substance, expansion engines for said secondary pressure generators, and connections for the exhaust from the expansion engines to said passages at the top of the next generator, substantially as described.

77. In a step-series engine, the combination with a heater, of a pressure generator thermally dissociated from the heater and having uniformly distributed and closely spaced passages extending downward through the working substance, connections between the heater and said passages at the top of the pressure generator for the circulating fluid, an expansion engine operated by said working substance, one or more secondary pressure generators having uniformly distributed and closely spaced passages extending horizontally and downward through successive layers of the working substance, expansion engines for said secondary pressure generators, and connections for the exhaust from the expansion engines to said passages at the top of the next generator, substantially as described.

78. In a step-series engine, the combination with a heater, of a pressure generator thermally dissociated from the heater and having uniformly distributed and closely spaced passages extending downward through the working substance, connections between the heater and said passages at the top of the pressure generator for the circulating fluid, an expansion engine operated by said working substance, one or more secondary pressure generators having uniformly distributed and closely spaced passages extending horizontally and downward through successive layers of the steam space and working substance, expansion engines for said secondary pressure generators, and connections for the exhaust from the expansion engines to said passages at the top of the next generator, substantially as described.

79. In a step-series engine, the combination with a heater, of a pressure generator thermally dissociated from the heater and having uniformly distributed and closely spaced passages extending downward through the working substance, connections between the heater and said passages at the top of the pressure generator for the circulating fluid, an expansion engine operated by said working substance, one or more secondary pressure generators having uniformly distributed and closely spaced passages with thin heat transmitting walls and extending horizontally and downward through successive layers of the working substance, expansion engines for said secondary pressure generators, and connections for the exhaust from the expansion engines to said passages at the top of the next generator, substantially as described.

80. In a step-series engine, the combination with a heater, of a pressure generator thermally dissociated from the heater and having uniformly distributed and closely spaced passages extending downward through the working substance, connections between the heater and said passages at the top of the pressure generator for the circulating fluid, an expansion engine operated by said working substance, one or more secondary pressure generators having uniformly distributed and closely spaced passages with thin heat transmitting walls and extending through the working substance, expansion engines for said secondary pressure generators, and connections for the exhaust from the expansion engines to said passages of the next generator, substantially as described.

81. In a step-series engine, the combination with a heater, of a pressure generator thermally dissociated from the heater for applying a circulating fluid to heating a working substance, connections from the heater to the pressure generator for the circulating fluid, an expansion engine operated by said working substance, one or more secondary pressure generators having uniformly distributed and closely spaced passages extending downward through the working substance, expansion engines for said secondary pressure generators, and connections for the exhaust from the expansion engines to said passages at the top of the next generator, substantially as described.

82. In a step-series engine, the combination with a heater, of a pressure generator thermally dissociated from the heater for applying a circulating fluid to heating a working substance, connections from the heater to the pressure generator for the circulating fluid, an expansion engine operated by said working substance, one or more secondary pressure generators having uniformly distributed and closely spaced passages extending horizontally and downward through successive layers of the working substance, expansion engines for said secondary pressure generators, and connections for the exhaust from the expansion engines to said passages at the top of the next generator, substantially as described.

83. In a step-series engine, the combination with a heater, of a pressure generator thermally dissociated from the heater for applying a circulating fluid to heating a working substance, connections from the heater to the pressure generator for the circulating fluid, an expansion engine operated by said working substance, one or more secondary pressure generators having uniformly distributed and closely spaced passages extending horizontally and downward through successive layers of the steam space and working substance, expansion engines for said secondary pressure generators, and connections for the exhaust from the expansion engines to said passages at the top of the next generator, substantially as described.

84. In a step-series engine, the combination with a heater, of a pressure generator thermally dissociated from the heater for applying a circulating fluid to heating a working substance, connections from the heater to the pressure generator for the circulating fluid, an expansion engine operated by said working substance, one or more secondary pressure generators having uniformly distributed and closely spaced passages with thin heat transmitting walls and extending horizontally and downward through successive layers of the working substance, expansion engines for said secondary pressure generators, and connections for the exhaust from the expansion engines to said passages at the top of the next generator, substantially as described.

85. In a step-series engine, the combination with a heater, of a pressure generator thermally dissociated from the heater for applying a circulating fluid to heating a working substance, connections from the heater to the pressure generator for the circulating fluid, an expansion engine operated by said working substance, one or more secondary pressure generators having uniformly distributed and closely spaced passages with thin heat transmitting walls and extending through the working substance, expansion engines for said secondary pressure generators, and connections for the exhaust from the expansion engines to said passages of the next generator, substantially as described.

86. In a step-series engine, the combination with a primary pressure generator and an expansion engine, of one or more secondary pressure generators having uniformly distributed and closely spaced passages extending downward through the working substance, expansion engines for said secondary pressure generators, and connections for the exhaust from the expansion engines to said passages at the top of the next generator, substantially as described.

87. In a step-series engine, the combination with a primary pressure generator and an expansion engine, of one or more secondary pressure generators having uniformly distributed and closely spaced passages extending horizontally and downward through successive layers of the working substance, expansion engines for said secondary pressure generators, and connections for the exhaust from the expansion engines to said passages at the top of the next generator, substantially as described.

88. In a step-series engine, the combination with a primary pressure generator and an expansion engine, of one or more secondary pressure generators having uniformly distributed and closely spaced passages extending horizontally and downward through successive layers of the steam space and working substance, expansion engines for said secondary pressure generators, and connections for the exhaust from the expansion engines to said passages at the top of the next generator, substantially as described.

89. In a step-series engine, the combination with a primary pressure generator and an expansion engine, of one or more secondary pressure generators having uniformly distributed and closely spaced passages with thin heat transmitting walls and extending downward through the working substance, expansion engines for said secondary pressure generators, and connections for the exhaust from the expansion engines to said passages at the top of the next generator, substantially as described.

90. In a step-series engine, the combination with a primary pressure generator and an expansion engine, of one or more secondary pressure generators having passages with thin heat transmitting walls extending through the working substance, expansion engines for said secondary pressure generators, and connections for the exhaust from the expansion engines to said passages of the next generator, substantially as described.

91. A boiler having its interior space divided by a series of parallel plates extending transversely to the boiler casing and placed side by side with spaces between them, alternate spaces connecting respectively with supply spaces for heating fluid and fluid to be heated, substantially as described.

92. A boiler having its interior space divided by a series of indented or corrugated parallel plates extending transversely to the boiler casing and placed side by side with spaces between them, alternate spaces connecting respectively with supply spaces for heating fluid and fluid to be heated, substantially as described.

93. A boiler having its interior space divided by a series of vertical parallel plates extending transversely to the boiler casing and placed side by side with spaces between them, and having an inlet at the top and outlet at the bottom for the heating fluid, and an inlet at the bottom and outlet at the top for the fluid to be heated, said pairs of inlets and outlets connecting respectively with alternate spaces between the plates, substantially as described.

94. A boiler consisting of a plurality of sections placed side by side, each section consisting of parallel plates with passages between them formed by indentations or corrugations in the plates, substantially as described.

95. A boiler consisting of a plurality of sections placed side by side, each section consisting of parallel plates with serpentine passages between them formed by indentations or corrugations in the plates, substantially as described.

96. A boiler consisting of a plurality of sections placed side by side, each section consisting of parallel plates having passages between them alternately contracted and expanded in cross section and formed by indentations or corrugations in the plates, substantially as described.

97. A boiler consisting of a plurality of sections placed side by side, each section consisting of parallel plates having passages between them formed by intersecting spherical or spheroidal indentations in the plates, substantially as described.

98. A boiler consisting of a plurality of sections placed side by side, each section consisting of paralled plates having zig-zag passages between them formed by intersecting staggered spherical or spheroidal indentations in the plates, substantially as described.

99. A boiler consisting of a plurality of vertical sections placed side by side with passages between them formed by indentations or corrugations in the plates and extending horizontally and vertically, and having an inlet at the top and outlet at the bottom for the heating fluid, and an inlet at the bottom and outlet at the top for the fluid to be heated, said pairs of inlets and outlets connecting, one with the passages within the sections and the other with the space between the sections, substantially as described.

100. A boiler section consisting of parallel plates with passages between them formed by indentations or corrugations in the plate, substantially as described.

101. A boiler section consisting of parallel plates having serpentine passages between them formed by indentations or corrugations in the plates, substantially as described.

102. A boiler section consisting of parallel plates brazed together at the edges only and having passages between them formed by indentations or corrugations in the plates, substantially as described.

103. A boiler section consisting of parallel plates having passages between them of irregular cross section alternately contracted and expanded and formed by indentations or corrugations in the plates, substantially as described.

104. A boiler section consisting of parallel plates having passages between them formed by intersecting spherical or spheroidal indentations in the plates, substantially as described.

105. A boiler section consisting of parallel plates having passages between them, each passage being formed by intersecting staggered spherical or spheroidal indentations in the plates, substantially as described.

106. In a step series engine, the combination with a heater, of a pressure generator thermally dissociated from the heater for applying a circulating fluid to heating a working substance, connections from the heater to the pressure generator for the circulating fluid, an expansion engine operated by said working substance, one or more secondary pressure generators and expansion engines, connections for the exhaust from the expansion engines to the next pressure generator, and a pipe from the heater passing to the successive pressure generators, and carrrying the waste gases of combustion for heating the working substances, substantially as described.

In testimony whereof I have hereunto set my hand in the presence of two subscribing witnesses.

A. M. WELLINGTON.

Witnesses:
C. J. SAWYER,
T. F. KEHOE.

Correction in Letters Patent No. 549,982.

It is hereby certified that in Letters Patent No. 549,982, granted November 19, 1895, upon the application of Arthur M. Wellington, of New York, N. Y., for an improvement in "Step-Series Engine Processes and Apparatus," an error appears in the printed specification requiring correction, as follows: On page 11, lines 104 to 110, the paragraph "The primary boiler process and boiler described, the means for employing the waste gases of combustion, and a boiler having the functional features described are claimed only in a step-series process or engine, as these subjects-matter are claimed, broadly, in other applications," should be stricken out, and that the said Letters Patent should be read with this correction therein that the same may conform to the record of the case in the Patent Office.

Signed, countersigned, and sealed this 17th day of December, A. D. 1895.

[SEAL.]

JNO. M. REYNOLDS,
*Assistant Secretary of the Interior.*

Countersigned:
JOHN S. SEYMOUR,
*Commissioner of Patents.*